(12) United States Patent
Link et al.

(10) Patent No.: US 7,496,798 B2
(45) Date of Patent: Feb. 24, 2009

(54) DATA-CENTRIC MONITORING METHOD

(76) Inventors: Jaw Link, 8777 E. Via De Ventura Dr., Ste 120, Scottsdale, AZ (US) 85258; Yu-tsung Wang, 8777 E. Via De Ventura De., Ste-120, Scottsdale, AZ (US) 85258; George Mink, 8777 E. Via De Ventura Dr., Ste 120, Scottsdale, AZ (US) 85258; Hoang Tran Van, 8777 E. Via De Ventura Dr., Ste 120, Scottsdale, AZ (US) 85258; Yi-hua He, 8777 E. Via De Ventura Dr., Ste 120, Scottsdale, AZ (US) 85258

( * ) Notice: Subject to any disclaimer, the term of this patent is extended or adjusted under 35 U.S.C. 154(b) by 454 days.

(21) Appl. No.: 11/354,805

(22) Filed: Feb. 14, 2006

(65) Prior Publication Data
US 2007/0220368 A1   Sep. 20, 2007

(51) Int. Cl.
*G06F 11/00* (2006.01)
(52) U.S. Cl. .............. 714/47; 714/26; 714/48; 702/179; 702/183
(58) Field of Classification Search ............ 714/47, 714/26, 48; 702/179, 181, 183
See application file for complete search history.

(56) References Cited

U.S. PATENT DOCUMENTS

| | | | |
|---|---|---|---|
| 5,951,611 A * | 9/1999 | La Pierre | 701/29 |
| 6,490,543 B1 | 12/2002 | Jaw | |
| 6,871,160 B2 | 3/2005 | Jaw et al. | |
| 6,898,554 B2 | 5/2005 | Jaw et al. | |
| 7,308,385 B2 * | 12/2007 | Wegerich et al. | 702/183 |
| 7,383,165 B2 * | 6/2008 | Aragones | 703/8 |
| 2001/0013107 A1 * | 8/2001 | Lewis | 714/47 |
| 2001/0032109 A1 * | 10/2001 | Gonyea et al. | 705/8 |
| 2002/0066054 A1 * | 5/2002 | Jaw et al. | 714/48 |
| 2002/0152056 A1 * | 10/2002 | Herzog et al. | 703/2 |
| 2002/0183866 A1 * | 12/2002 | Dean et al. | 700/26 |
| 2003/0120402 A1 * | 6/2003 | Jaw | 701/29 |
| 2004/0117150 A1 * | 6/2004 | Cuddihy et al. | 702/182 |
| 2005/0210337 A1 * | 9/2005 | Chester et al. | 714/47 |
| 2006/0280357 A1 * | 12/2006 | Seligson et al. | 382/144 |
| 2008/0097637 A1 * | 4/2008 | Nguyen et al. | 700/110 |

* cited by examiner

*Primary Examiner*—Marc Duncan
(74) *Attorney, Agent, or Firm*—The Halvorson Law Firm

(57) ABSTRACT

Health management of machines and/or equipment, such as gas turbine engines, airplanes, and industrial equipment using a model centric method.

21 Claims, 3 Drawing Sheets

Data-centric method for predicting future performance or capabilities

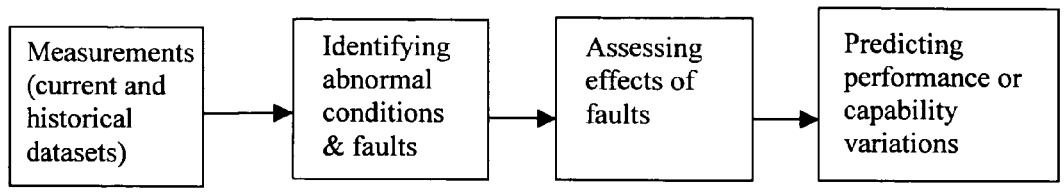
Figure 1: Process flow of condition monitoring method
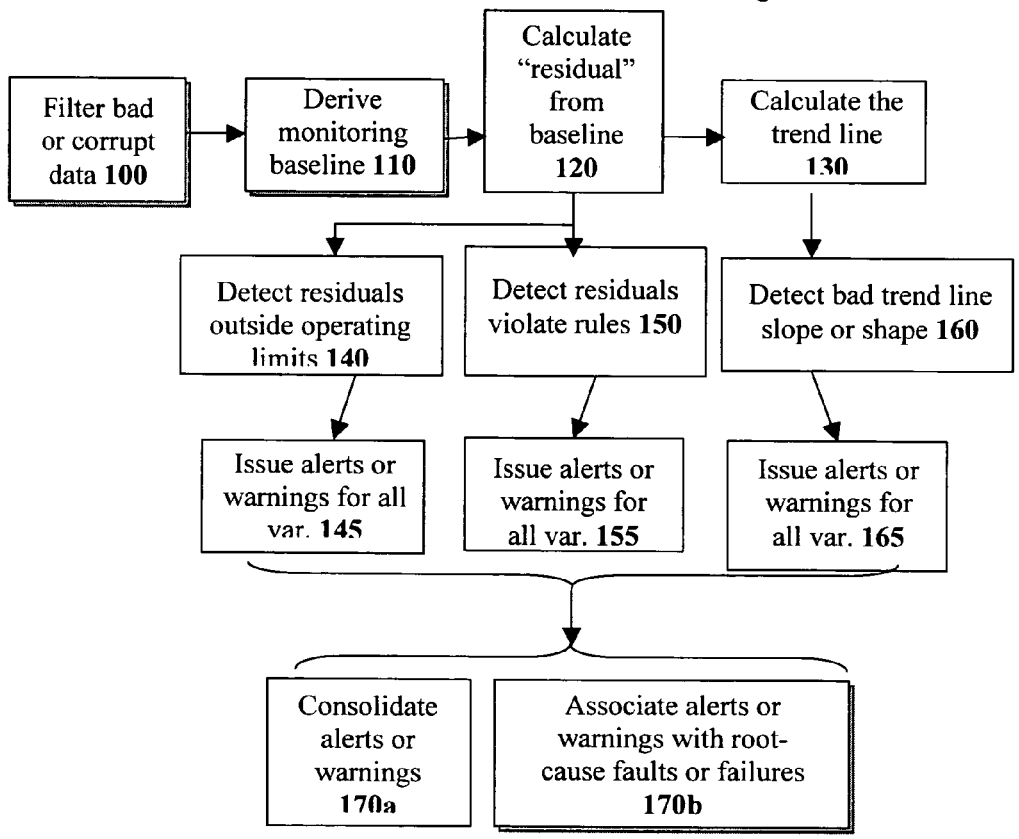
Figure 2: Data-centric method for identifying abnormal conditions and faults

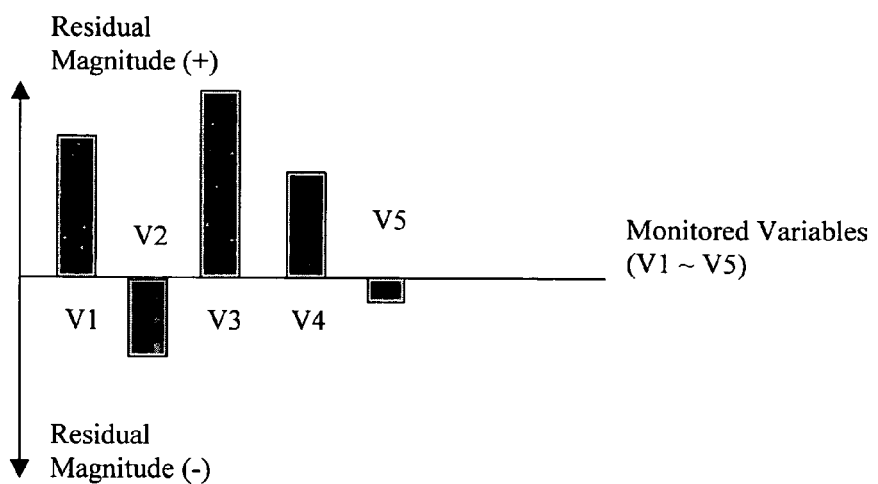
Figure 3: A pattern or signature of residuals from a set of monitored variables
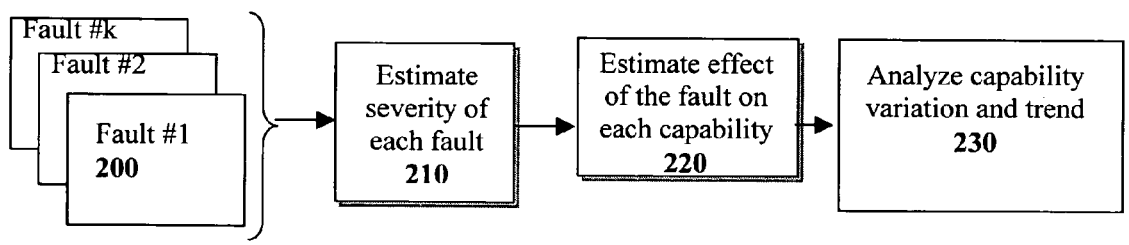
Figure 4: Method for assessing the effects of each fault

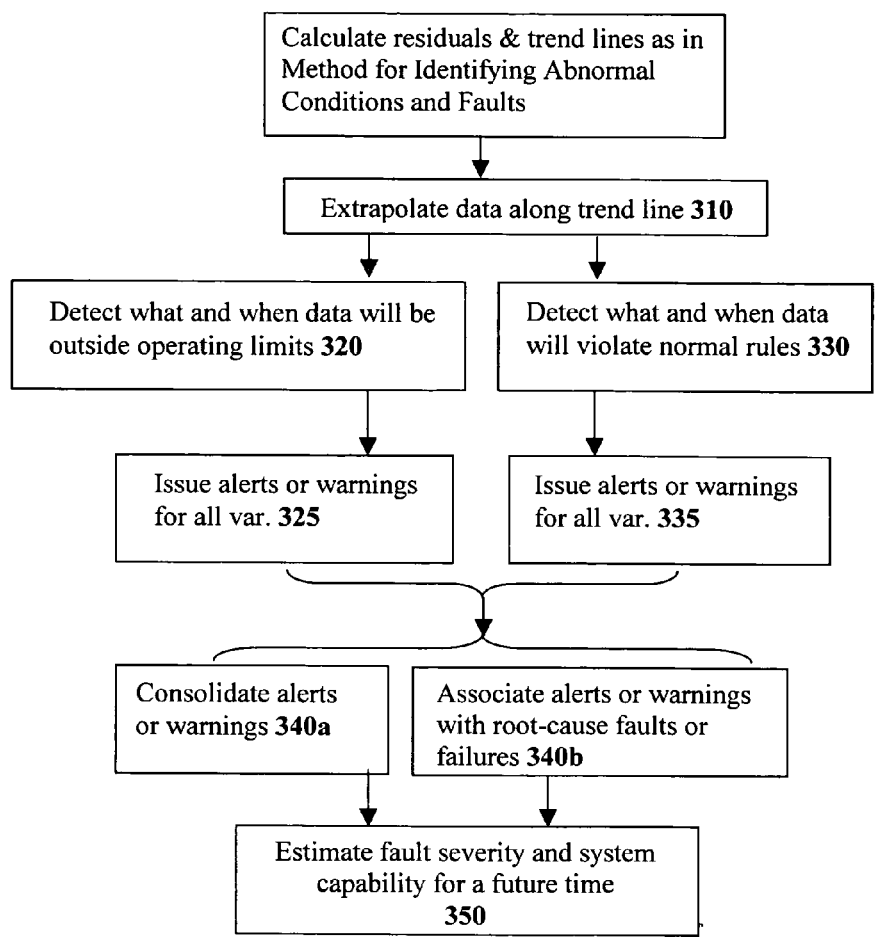
Figure 5: Data-centric method for predicting future performance or capabilities

DATA-CENTRIC MONITORING METHOD

FIELD OF THE INVENTION

The present invention relates to a data-centric monitoring method for a system and/or equipment.

BACKGROUND

Health management is a modern phrase for equipment condition monitoring and maintenance planning, especially in an asset-intensive and downtime-sensitive industry. In a historical perspective, Condition Monitoring System (CMS) is a generally accepted term for a ground-based (remote) or an on-board system (local) that performs some level of condition monitoring and health management. The scope of a CMS typically includes fault alert, detection, and isolation. Maintenance planning is performed by some ground-based systems and is mostly concerned with scheduled inspections and time-based repairs, or On-Condition Maintenance (OCM), i.e., a part is replaced only for cause.

With the recently emphasis on Reliability-Centered Maintenance (RCM), the goal of health management has been focused on implementing a systematic process of determining the maintenance requirements of a physical asset, which may be an entire piece of equipment such as an engine or a single part of the equipment/system, to ensure its readiness, performance, and operability. To determine maintenance requirements effectively, the identification of potential failures and the prediction of failure progressions are essential; hence the Condition Based Maintenance (CBM) or Prognostics and Health Management (PHM) philosophy has also been emphasized recently in industries such as the aerospace industry. The various functions of health management are illustrated in FIG. 1.

The purpose of equipment health management is to realize significant benefits in operations planning and reduced cost of ownership. To realize these benefits, the various health management functions, as illustrated in FIG. 1, must be efficiently integrated and timely updated with new information. Many monitoring techniques exist to address CBM or RCM requirements; however, most of these techniques focus on a specific monitoring application, or they try to solve a particular problem in equipment health management. Furthermore, some of these techniques suffer from frequent false alarms (or false detections) because the nature of the data is noisy and complex which do not lend themselves for traditional statistical or data-centric analysis Thus, there is an increasing need for improved machinery and/or equipment health management and methods for meeting the accuracy and system integration requirements of modern condition monitoring practices like the CBM and RCM. This need for effective monitoring of machinery/condition and efficient maintenance planning is present not just for the aerospace industry, it is prevalent for other industries as well, including, but not limited to transportation, industrial production, and manufacturing.

SUMMARY OF INVENTION

The present invention is embodied in methods for data-centric monitoring of equipment health. The methods provide a more integrated approach to monitoring the operating condition of a piece of equipment or a system. They can also be applied to a broad range of monitoring applications and problems.

Monitoring is typically interested in the awareness of the condition, state, damage, performance, capability, or safety of a machine or a system. Monitoring (or condition monitoring) typically involves the following four steps: 1) measuring key operating parameters of the system, 2) identifying one or more abnormal conditions, 3) grouping or consolidating related abnormal conditions into one or more discernable fault or failure or degradation types, 4) assessing the effect of each fault type on system performance or capability, and 5) predicting the variation or degradation of performance/capability in the future. Steps 1-4 are related to diagnosis, while step 5 is related to prognosis.

The monitoring concept applies not just to machines or equipment, it can be applied to a wide range of "systems," such as monitoring the performance of a vehicle, monitoring the performance of a computer software, monitoring the health of human bodies, or monitoring the performance of student's learning progress. For applications in different industries or scientific fields, different measurement devices and apparatuses may be used. For instance, displacement, speed, temperature, or pressure sensors may be used to measure the operating parameters of a machine; while temperature, pressure, oxygen, or heart beat sensors may be used to measure the parameters of a living body; moreover, tests, examinations, project assignments may be used to measure the performance of student's learning.

The present invention is concerned with the method for condition monitoring, specifically, it describes a data-centric method for conducting Steps 2-5 (i.e., diagnosis and prognosis) for any system that relies on measurements to determine the current and future conditions of the system. This method consists of three steps as shown in FIG. 1. Details of how each step is performed are described below.

It is an object of the present invention to provide a data-centric method for condition monitoring of a system, where the system can be a machine, an equipment, a vehicle, a computer software, a human being, or an animal. The method relies on the measurements of system properties to accomplish the purposes of monitoring.

It is another object of the present invention to identify abnormal conditions of the system to be monitored.

It is yet another object of the present invention to identify the root-cause fault or failure or failure mode.

It is still yet another object of the present invention to assess the effects of an identified fault on system capability.

It is a further object of the present invention to predict the variation or degradation of a system capability.

Although measurement methods and devices are not the subject of the present invention, the present invention assumes that measurements have been collected in the form of either isolated snapshots or continuous, repeated recording (that may or may not be periodic). Once a set of measurements is stored on a computer, it becomes a part of the "historical database" that contains the measurements of the system from the past, up to the most recent set of measurements. For clarity, the most recent set of measurements is called the "current data set" and the measurements are called "data." Historical data may also contain information about faults, failures, repairs or cure results.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWING

FIG. 1 shows the process flow of a condition monitoring method.

FIG. 2 outlines the data-centric method for identifying abnormal conditions and faults.

FIG. 3 shows a pattern or signature of residuals from a set of monitored variables.

FIG. 4 outlines a method for assessing the effects of each fault.

FIG. 5 is a data-centric method for predicting future performance or capabilities.

DETAILED DESCRIPTION OF PREFERRED EMBODIMENTS

The present invention is concerned with a method for data-centric monitoring and maintenance planning for equipment and/or systems.

Various sensors are attached to equipment or systems that are to be monitored. Measurements (measured data) from these sensors are collected and converted into engineering units, the data are then validated and noise removed from the signal. These initial steps are considered sensory input processing and the result is higher-quality information about the actual operating condition of the physical system being measured. After the sensory input data are processed, these data can be used with confidence in other health management functions.

Equipment or system health management deals with data. Data are collected facts. These data cannot be used or analyzed further until they are validated and filtered. The present invention uses advanced signal processing and statistical methods to analyze data. Before the system data are trended, the user must validate the input data.

The data-centric method according to the present invention for identifying abnormal conditions and faults consists of some or all of the following substeps as shown in FIG. 2. They include: 1) filtering of bad or corrupt data, block 100; 2) deriving a baseline (or expected value) from the remaining data for each monitored variable of the system, block 110; 3) calculating a residual value from the baseline (or the difference between a data point and the baseline value) corresponding to the same operating condition for each monitored variable, block 120; 4) calculating a trend line based on the residuals of each monitored variable, block 130; 5) detecting the data points whose residuals fall outside a normal operating limit for each monitored variable, block 140; 6) detecting the data points whose residuals violate one or several rules for abnormal conditions for each monitored variable, block 150; a preferred rule is to compare each residual against its statistically significant value as the threshold for determining a violation; 7) detecting a rapidly changing trend line slope or shape, block 160; 8) issuing one or multiple alerts/warnings for a rapidly changing trend line slope or shape, block 165; 9) issuing one or multiple alerts/warnings for the data points that have fallen outside the limits, block 145; 10) issuing one or multiple alerts/warnings for the data points that have violated abnormal condition rules, block 155; 11) consolidating multiple alerts/warnings that correspond to the same cause (or root cause) into a single alert/warning, this step can also be described as associating alerts/warnings with root-cause failure modes or faults, blocks 170a and 170b, respectively. Operating limits and abnormal condition rules can have different levels (or threshold values) for the same monitored variable, consequently, the alerts associated with exceeding certain operating limit or abnormal condition rule can have different levels.

Filtering bad or corrupt data, block 100, is performed by applying one or more of the following steps to all the data: 1) reducing variability of a data point by dividing or multiplying one or more correction factors; 2) reducing variability by shifting a data point to a selected reference point; 3) reducing variability by transforming a data point through a functional mapping or a filter; 4) reducing variability by combining the data points from several monitored variables; 5) removing a data point that is outside a statistically significant threshold; 6) removing a data point that corresponds to an unacceptable operating condition; 7) removing a data point that is corrupted by measurement noise; or 8) removing a data point that has error in transmission or conversion.

Deriving the baseline, block 110, is performed by one or more of the following steps: 1) establishing a nominal value from historical data for each monitored variable at each operating condition; 2) adjusting the nominal value for the variation in the operating condition; 3) adjusting the nominal value for the variation in system state variables; or 4) adjusting the nominal value for the variation in system input variables.

The present invention uses information fusion technology to identify potential failures. A preferred fusion technique is to use a hybrid, artificial intelligent algorithm to identify possible failure conditions based on the data collected. Multiple possible failure conditions can be enunciated. An estimated confidence level is associated with each failure condition to help health management or maintenance personnel troubleshoot the system.

Fault identification is concerned with the detection and isolation of abnormal conditions and/or faults. A fault can be the abnormality that has "grown" to the extent beyond a safe operating limit, or it can be an abnormality that is still in development but has not yet reached a predetermined limit. In either case a predetermined threshold or a class boundary is assumed which categorizes the abnormality as a fault. Detection of a fault is simply a knowledge that the abnormality exists, while isolation of the fault requires that the cause (or faulty root component of the physical system) be determined for the abnormality.

Associating alerts with root-cause faults, block 170b, is performed by one or more of the following steps: 1) matching the alerts with similar alerts from previously confirmed faults; or 2) matching the residual pattern with probable fault/failure patterns, where a "pattern" is a collection of the magnitude and the sign of the residuals of a subset (or the complete set) of monitored variables; an example of a residual pattern (or signature) is shown in FIG. 3.

The method for assessing the effect of each fault consists of several substeps, which typically include: 1) estimating the seriousness or severity of each fault (or failure mode); 2) estimating the effect of each fault on each of the system capabilities of interest (which may include: performing a certain function, producing a certain availability level, or maintaining a certain health level); and 3) analyzing the variation of each of the capability of interest or each fault in the past (i.e., how has each capability or fault changed over time). These substeps are illustrated in FIG. 4.

The severity of each fault, block 200, is estimated by comparing the magnitude of one or a subset of residuals with the corresponding "reference" residuals, block 210. The reference residuals are derived from historical data.

The effect of each fault on each capability is estimated by comparing the relative values (or levels) between the estimated fault severity, block 210, and a "reference" fault severity and then adjusting the effect of the reference fault (or "reference" fault effect) proportionally according to the severity values, block 220. The reference fault effect is correlated to a reference fault severity, which in turn, is correlated to one or a set of reference residuals, block 230. These correlation are also derived from historical data.

The data-centric method for predicting the variation in performance or capability in the future consists of several substeps, which include some or all of the following substeps as shown in FIG. 5: 1) extrapolating the calculated trend line into the future, block 310; 2) detecting when and what data points will be outside control limits, block 320; 3) detecting when and what data points will violate control rules, block 330; 4) issuing one or multiple alerts/warnings for the data points whose residuals are expected to fall outside a normal operating limit, while following the same trend line shape, for each monitored variable, block 325; 5) issuing one or multiple alerts/warnings for the data points whose residuals are expected to violate abnormal condition rules, while following the same trend line shape, for each monitored variable, block 335; 6) consolidating multiple, expected future alerts/warnings that correspond to the same fault (or failure) into a single alert/warning, block 340a; or associating future alerts/warnings with one or more root-cause faults or failure modes by following the same approach as described in the method for identifying abnormal conditions and faults, block 340b; 5) predicting each capability of interest for a future time period by following the approach in the method for assessing the effect of abnormal conditions described above, block 350; or 6) extrapolating the fault-effected capability, estimated according to the method for assessing the effect of abnormal conditions, block 220, into the future time period.

Preferably, the method according to the present invention is implemented in a computer software system comprising a suite of tools, or modules, that perform the various health management functions. To facilitate information processing and decision making in different industries and for different applications, these tools may differ to suit the needs of a particular industry or equipment; nevertheless, the algorithmic principles behind these tools are similar for similar functions.

Under a general categorization, software for the present invention comprises two types of tools: Front-end tools (user interface used for selecting desired analytical functions and for displaying results) and Back-end tools (for processing, analysis, and other computations). The functionality of back-end tools includes, but is not limited to: data analysis; data mining; information fusion; fault identification; failure prediction; life prediction; health assessment, forecasting of inventory demands; prediction of work scope; planning of mission and maintenance operations; and maximization of return on assets.

The ultimate goals of the present invention are to: reduce the downtime (or increased availability and readiness); optimize the inventory of spare parts; level the work scope; and reduce the cost of ownership.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A data-centric monitoring method for detecting, isolating, and predicting abnormal conditions in a system comprising the steps of:
   a) acquiring measured data relating to at least one part or piece of the system;
   b) filtering bad or corrupt data;
   c) deriving a baseline for each monitored variable;
   d) calculating a residual from the baseline for each data point;
   e) calculating a trend line based on the residuals of each monitored variable;
   f) detecting data points whose residuals fall outside a normal operating limit for each monitored variable;
   g) detecting data points whose residuals violate one or several rules for abnormal conditions for each monitored variable;
   h) detecting any rapidly changing trend line slope or shape;
   i) issuing one or multiple alerts or warnings for any violations of the above; and
   j) consolidating multiple alerts or warning that correspond to the same cause into a single alert or warning of fault or faults;
   k) estimating the severity of each fault;
   l) estimating the effect of each fault on each system capability;
   m) analyzing each system capability variation of trend;
   n) extrapolating data along the trend line;

o) detecting when data points will be outside operating limits;

p) detecting when data points will violate abnormal condition rules;

q) issuing one or multiple alerts or warnings for any detected violations of steps "o" and "p"; and r) consolidating multiple alerts or warning that correspond to the same cause into a single alert or warning;

s) estimating fault severity and system capability over a future time window of interest.

2. The method according to claim 1 wherein the step of filter bad or corrupt data comprises the step of reducing variability of data points by dividing or multiplying the data points by one or more correction factors.

3. The method according to claim 2 further comprising the steps of extrapolating along the trend line, detecting what and when data will be outside control limits or control rules, and issuing alerts or warnings for any variables that deviated from control limits or control rules.

4. The method according to claim 1 wherein the step of filter bad or corrupt data comprises the step of reducing variability of data points by referring the data points to a selected reference point.

5. The method according to claim 4 further comprising the steps of extrapolating along the trend line, detecting what and when data will be outside control limits or control rules, and issuing alerts or warnings for any variables that deviated from control limits or control rules.

6. The method according to claim 1 wherein the step of filter bad or corrupt data comprises the step of reducing variability of data points by transforming the data points through a functional mapping.

7. The method according to claim 6 further comprising the steps of extrapolating along the trend line, detecting what and when data will be outside control limits or control rules, and issuing alerts or warnings for any variables that deviated from control limits or control rules.

8. The method according to claim 1 wherein the step of filter bad or corrupt data comprises the step of reducing variability of data points by combining the data points from several monitored variables.

9. The method according to claim 8 further comprising the steps of extrapolating along the trend line, detecting what and when data will be outside control limits or control rules, and issuing alerts or warnings for any variables that deviated from control limits or control rules.

10. The method according to claim 1 wherein the step of filter bad or corrupt data comprises the step of removing data points that correspond to unacceptable operating conditions.

11. The method according to claim 10 further comprising the steps of extrapolating along the trend line, detecting what and when data will be outside control limits or control rules, and issuing alerts or warnings for any variables that deviated from control limits or control rules.

12. The method according to claim 1 wherein the step of filter bad or corrupt data comprises the step of removing data points that are corrupted by measurement noise.

13. The method according to claim 12 further comprising the steps of extrapolating along the trend line, detecting what and when data will be outside control limits or control rules, and issuing alerts or warnings for any variables that deviated from control limits or control rules.

14. The method according to claim 1 wherein the step of filter bad or corrupt data comprises the step of removing data points that have errors in transmission or conversion.

15. The method according to claim 14 further comprising the steps of extrapolating along the trend line, detecting what and when data will be outside control limits or control rules, and issuing alerts or warnings for any variables that deviated from control limits or control rules.

16. The method according to claim 1 wherein the step of filter bad or corrupt data comprises two or more of the following steps: reducing variability of data points by dividing or multiplying the data points by one or more correction factors, reducing variability of data points by referring the data points to a selected reference point, reducing variability of data points by transforming the data points through a functional mapping, reducing variability of data points by combining the data points from several monitored variables, removing data points that correspond to unacceptable operating conditions, removing data points that are corrupted by measurement noise, and removing data points that correspond to unacceptable operating conditions.

17. The method according to claim 16 further comprising the steps of extrapolating along the trend line, detecting what and when data will be outside control limits or control rules, and issuing alerts or warnings for any variables that deviated from control limits or control rules.

18. The method according to claim 1 further comprising the steps of extrapolating along the trend line, detecting what and when data will be outside control limits or control rules, and issuing alerts or warnings for any variables that deviated from control limits or control rules.

19. The method according to claim 18 further comprising the step of associating the alerts or warnings with root-cause faults or failure by matching the alerts with similar alerts from previously confirmed faults or matching the residual pattern with probable fault/failure patterns, where a "pattern" is a collection of the magnitude and the sign of the residuals of a subset (or the complete set) of monitored variables.

20. The method according to claim 1 further wherein the trend line is linear.

21. The method according to claim 1 wherein the trend line is a higher order line, such as a quadratic or cubic curve.

* * * * *